Oct. 7, 1969    J. P. AU WERTER    3,470,896
PARALLEL LINE FLUID SYSTEM WITH METER REGULATING VALVE
Filed Jan. 7, 1965    2 Sheets-Sheet 1

INVENTOR.
JAY P. AUWERTER
BY Bosworth, Sessions,
Herrstrom and Knowles
ATTORNEYS.

United States Patent Office 3,470,896
Patented Oct. 7, 1969

3,470,896
PARALLEL LINE FLUID SYSTEM WITH METER REGULATING VALVE
Jay P. Au Werter, 23276 Laureldale Road, Cleveland, Ohio 44122
Filed Jan. 7, 1965, Ser. No. 423,910
Int. Cl. F17c 1/06, 3/00
U.S. Cl. 137—110
11 Claims

ABSTRACT OF THE DISCLOSURE

A fluid flow control system, particularly adapted for metering the flow of steam, having main and base load pipes connected in parallel between a source of fluid supply and a discharge. The base load pipe has an orifice in it and the difference in pressure between the high pressure side and the low pressure side of the orifice is used to control a valve in the main pipe, the opening and closing of the valve being responsive to the resultant of the fluid pressure in the main pipe acting on the valve body, the difference between the pressures on opposite sides of the orifice in the base pipe acting on a movable piston connected to the valve body, and the force of gravity acting on the valve body and associated parts.

---

This invention relates to fluid flow control systems, more particularly to a system for regulating the relative flow through a plurality of pipes connected to a common source of fluid supply.

In fluid systems of the type wherein fluid from a common source travels through a plurality of pipes in parallel to a use or to several uses, it is often necessary or desirable to provide a control which restricts the flow in one or more of the pipes in response to a predetermined condition in order to confine the flow to another pipe or group of pipes. For example, in steam systems employing meters of different operating capacities located in parallel lines for measuring total steam usage, it is desirable to prevent the flow of steam through a pipe having a large capacity meter when the flow through the system is at a low rate in order to eliminate inaccuracies that result from meter operation below rated capacity. Closing the pipe having the high capacity meter restricts the steam flow to the parallel pipe having a low capacity meter; the latter is thus able to operate at or near its rated capacity. When the rate of steam usage increases, the flow through the pipe having the large capacity meter is restored at some rate still within the range of the low capacity meter and both meters function as long as the high rate of usage continues. Thus, the system gives accurate reports on steam consumption over a wide range of flow rates.

The principal object of the invention is, therefore, to provide a flow control system of the character referred to which automatically restricts the fluid flow in one pipe of the system in response to a predetermined condition and automatically restores such flow in response to another predetermined condition. As a further object and advantage, the system contemplates an arrangement in which the pressure losses between the supply and the use are at a minimum so as to achieve higher over all efficiency, as in the case of a system which has a steam turbine.

It is known that steam systems can be metered over wide load ranges using electric motor operated valves with suitable electrical controls to provide for sequential operation of meters in different parallel pipes of the system. However, such electrical systems are not completely satisfactory because of the high cost and the need for a source of electrical energy. Thus, another object of the present invention is to provide a fluid control system of the type referred to which functions without an external power source.

Although control systems such as are referred to above are particularly suited to steam metering, other uses are apparent. For example, it is feasible to regulate the supply of steam or other fluid from a source that varies over a wide range to a use requiring a relatively low constant rate flow, the excess being discharged to waste or to storage through a pipe paralleling the pipe leading to the use. It is contemplated to goven such discharge of the excess under the control of devices constructed and arranged in accordance with the principles of the present invention.

Other objects and advantages will become apparent as the description proceeds and are concerned with the provision of a fluid flow control system of the character referred to which is simple in design and construction, relatively easily built and assembled, and inexpensive to manufacture and maintain. This description is made in connection with the accompanying drawings which illustrate an embodiment representing the best known mode of practicing the invention.

Figure 1:
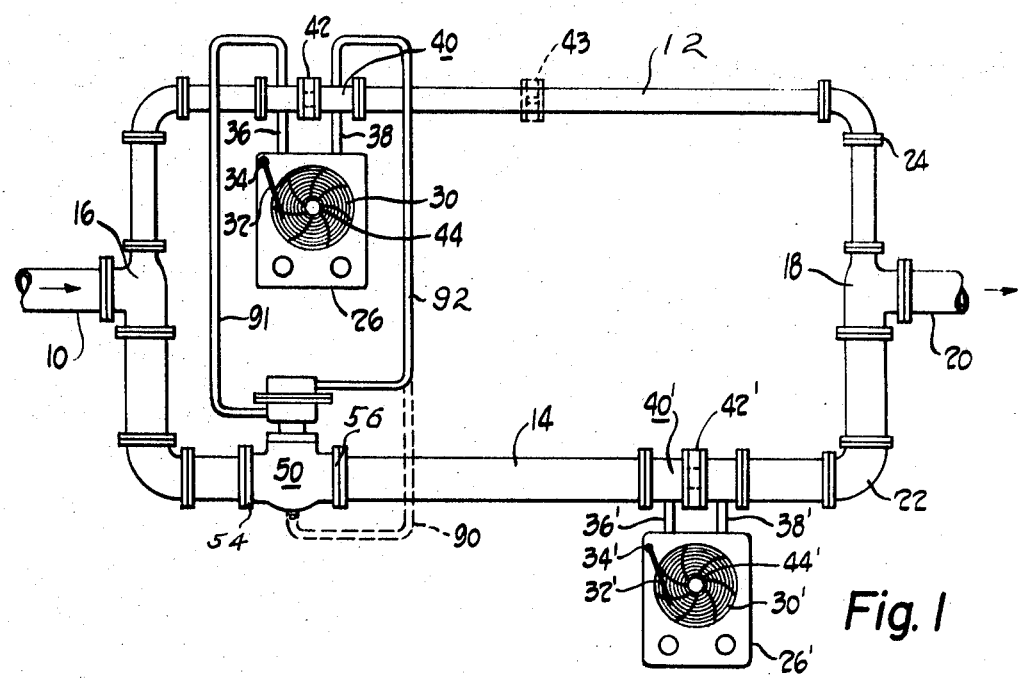
FIG. 1 is a schematic layout of a parallel line piping system for controlling and measuring the flow of steam from a supply to a use.

The system of the present invention is shown in an arrangement for controlling the flow of steam from a relatively high pressure supply such as a main of a municipal utility to a conventional use having a flow rate demand that varies over a wide range. For example, an industrial plant which has both power and heating requirements is such a use, the heating load being higher during the day than during the night and the power load, wholly absent during the night, varying widely during the regular working hours of the day. High pressure steam or other fluid is received from the source through a supply pipe 10. This pipe is connected to both a base load pipe line 12 and a main pipe line 14 through a T 16. At a point beyond the control and metering elements of this system the pipes 12 and 14 join at a T 18 and are connected by it to a common pipe 20 which constitutes the outlet of the control system and carries the metered fluid to the intended use.

The pipes 12 and 14 are each so connected and arranged between the supply and use pipes 10, 20 that there is free flow of the steam subject, of course, to the control and metering components to be described. At turns and bends in the system the conduit or pipe sections comprising the pipes 12 and 14 are connected by suitable elbows or bends 22, the various pipe joints being made by screwing the parts together or, as shown, by conventional flanged joints indicated at 24.

In order to measure the fluid flow through the parallel pipe lines 12, 14 they are each fitted with suitable metering means which may be any of various by-pass, in line, pressure differential or other well known types commercially available for sensing and indicating fluid flow through conduits. For example, the two metering assemblies may be Shuntflo meters, models 401 and 402, respectively, sold by BIF Division of the New York Air Brake Company, Providence, R.I. The metering assemblies and the manner in which they are installed or connected in or to the pipe lines are thus conventional. For purposes of explanation and illustration, meters of the recording type are shown schematically. The following description is directed to the meter 26 connected to the base pipe line 12, it being understood that the same description applies to the meter 26' and that the same reference numerals primed, are applied to the meter 26' as are applied to like parts of the meter 26. In such a meter, a rotating chart, indicated at 30, is marked by a stylus carried on the end of a swing arm 32 pivoted at 34 on a shaft which is governed by the internal mechanism of the meter. The meter mechanism is connected to the pipe line with which the meter is associated by inlet and outlet tubes 36, 38, which extend from an orifice plate assembly 40 interposed in the pipe line. A plate with an orifice in it is carried by central element 42 of the orifice plate assembly, such plate constituting a restriction to flow through the pipe. When fluid is flowing through the pipe in which the orifice plate assembly is located, a pressure differential occurs between the bodies of fluid on the upstream and downstream sides of the orifice plate. The pressure differential thus created is transmitted into the meter 26 or 26', as the case may be, through one of the upstream tubes 36 and through one of the downstream tubes 38. Thus the pressure differential in the fluid on opposite sides of the orifice plate is translated by the meter mechanism into rate of flow, the condition sensed being utilized to turn the shaft on which the swinging arm 32 is mounted so as to record on the chart 30 the flow rate currently prevailing in the pipe line. The chart 30 is conveniently divided into seven sections, representing the days of the week and mounted to turn on a shaft 44 normal to the plane of the sheet. Suitable mechanism turns the chart 30 so as to make one revolution per week. In this manner the stylus carried by the swinging arm 32 records on the face of the chart 30 the rate of flow through the associated pipe for an entire week. The charts are renewed at the same time each week so as to preserve a permanent record of the flow rates. By cumulating and correlating the charts from the meters 26 and 26' the flow rate through the system at any instant can be determined and the total quantity of fluid flowing through the control system in any given period of time can be readily determined.

Each of the meters 26, 26' is calibrated for use with an orifice plate of a certain size. The passage through the orifice plate in the assembly 40 of the base load pipe line 12 is relatively small, since the meter 26 is intended to sense and record flow rates over a relatively low range. The passage through the orifice plate of the assembly 40' in the main pipe line 14 is relatively large since the meter 26' is intended to sense and record over a relatively large range. When the system is under heavy load and the steam or other fluid flows in through the supply pipe 10 and out through the use pipe 20 at a high rate, there is no problem, the flow merely dividing between the base load pipe line 12 and the main pipe line 14 inversely in proportion to their resistances to fluid flow. In such a situation a relatively large flow rate occurs through the main pipe line 14 and is accurately sensed and recorded by the meter 26'; a relatively low flow rate occurs through the base load pipe line 12 and is accurately recorded on the chart 30 of the meter 26.

At relatively low flow rates, that is, when the fluid flow into the system through the supply pipe 10 and out through the use pipe 20 is relatively small, the flow through the main pipe line 14 is insufficient to maintain a pressure differential at the orifice plate associated with the meter 26' sufficient to work the meter 26' within its rated capacity range. Moreover, the flow through the base load pipe line 12 may be insufficient to work the meter 26 within its rated capacity range. However, if the main pipe line 14 is closed during those periods of time that the system is operating at a low rate, the entire flow takes place through the base load pipe line 12 and is accurately sensed and recorded by the meter 26 down to its low registration point. In order for the parallel line system to be effective and to function as intended, the flow of fluid through the main pipe line 14 is arrested before its flow rate falls below that at which the meter 26' no longer functions accurately. To eliminate over-running of the meter 30 a supplemental orifice plate assembly 43 optionally may be inserted in the base load pipe line 12, as indicated in broken lines. The orifice plate in the assembly 43 constitutes a flow restrictor which reduces the pressure drop which otherwise would occur across the orifice plate of the assembly 42.

When the system is operating with the main pipe line 14 closed, the entire flow then being through the base load pipe line 12 and measured by the meter 26, it is essential that flow through the main pipe line be restored when the flow rate through the base pipe line 12 exceeds a predetermined value somewhat below the maximum capacity of the meter 26 and its associated orifice plate. Thus, the meters 26 and 26' and their associated orifice plates in the members 42, 42' of the orifice plate assemblies 40, 40' are so selected that their operating ranges overlap, the maximum flow rate capability of the meter 26 being somewhat above the minimum flow rate capability of the meter 26'. The rated capacity of a meter such as referred to is not necessarily its maximum capability, which latter may greatly exceed rated capacity by as much as fifty percent.

The necessary switching of the system from single fluid flow through the base load pipe line 12 to parallel fluid flow simultaneously through the pipes 12 and 14 is accomplished by a valve 50 connected into a horizontal run of the main pipe line 14. It comprises suitable casing means such as a conventional globe body 52 having a through passage continuous with the passage in the pipe line 14. The ends of the valve body 52 are suitably connected to the conduit sections which comprise the main pipe line as by threaded joints or, as shown, by circular flanges 54, 56. A partition 58 divides the interior of the valve casing into an upstream inlet chamber 60 and a downstream outlet chamber 62. A circular horizontal opening is formed in the partition 58 communicating the inlet chamber 60 with the outlet chamber 62 for the flow of fluid through the valve and the main pipe line. A suitable valve seat 66 is formed in the partition or, as shown, in a suitable valve seat insert 64 screwed or otherwise secured in the through opening. The casing 52 is so oriented that the valve seat 66 is horizontally disposed.

A circular valve body 68, secured on the lower end of a vertical rod 70 as by a pin 72 is engageable with the seat 66 to close the passage through the partition and arrest the flow of steam through the casing 52. At its lower end the rod 70 is guided for easy sliding movement in a central sleeve 74 if a spider formed integrally with the ring-shaped valve seat insert 64. At its upper end the rod 70 is secured to a piston 77 located in a chamber formed by neck member 81 and heated member 82 of the valve casing assembly. A transverse pin 75 holds the rod 70 in an axial socket of a central boss 76 depending from the head of the piston. The neck and head members are formed with circular outwardly directed radial flanges 83, 84 secured together by bolts 85. These flanges clamp between them in sealing relation a circular metal plate 86 which divides the interior chamber into lower portion 78 and upper portion 79. Disposed in a central circular opening in the plate 86 and secured to the latter as by welding all around is a cylindrical metal sleeve 87 which closely surrounds the piston 77 in sliding relation to serve as a guide for such piston.

Packing rings 88 are provided in annular grooves formed in the skirt portion of the piston 77 to minimize leakage of gases.

A tubular conduit 91, secured to the neck member 81 and to the orifice plate assembly 40 in the base load pipe line 12, places the chamber portion 78 below the plate 86 in communication with the body of fluid in the base load pipe line on the high side of the orifice plate member 42. Another tubular conduit 92 is secured to the head member 82 and to the orifice plate assembly 40 on the downstream side of the orifice plate member 42, placing the upper portion 79 of the chamber between the neck and head members 81, 82 in communication with the body of fluid on the low side of the orifice plate member 42. When restrictions such as the supplemental orifice plate assembly 43 or long pipe runs occur between the pipe T 18 and either the orifice plate 42 or the valve 50, resulting in a differential between the pressure in the upper chamber portion 79 and the pressure in the outlet chamber 62 when the valve is closed, the conduit 92 optionally may be provided with a branch conduit 90, shown in broken lines, for the purpose of equalizing such pressures. The branch 90 is connected either into the main pipe line 14 closely adjacent the valve 50 or, as shown, directly into the outlet chamber 62 with plug 89 removed.

The lower end of the neck member 81 is suitably secured to the main casing 52 as by an integral circular flange 93 and bolts 94. The flange 93 has a bottom circular face which seals against a circular face 95 on the casing 52 surrounding an opening into the high pressure chamber 60. A bushing 96 is screwed centrally into the bottom of the neck member 81 and surrounds the rod 70 with an easy sliding fit; this bushing does not grip the rod and no packing is employed which would impose any substantial frictional restraint on relative axial sliding movement. This is for the reason that the valve body 68 together with the rod 70 and the piston 77 comprises a valve sealing unit which normally tends to rest by gravity against the valve seat 66 to seal the steam passage through the casing 52. When the valve body 68 is withdrawn from the seat 66, the force of gravity on the movable assembly which comprises the valve sealing unit tends to restore the valve body to its passage sealing engagement with the valve seat 66. It is permissible for some pressure equalizing leaking or bleeding of fluid to occur between the high pressure chamber portion 78 in the neck member 81 and the high pressure inlet chamber 60 in the casing 52. However, such bleeding is held to a minimum by closely fitting the bushing 96 around the rod 70 so that at any instant or short time interval the pressures in the two chambers are substantially independent of one another. Fluid flow through the bushing 96 occurs only at a slow rate and permits fluid pressure prevailing in the high pressure or high side chamber 78 to act on the under side of the piston 77 for a short but effective time period independently of the pressure in the chamber 60.

Figure 2:
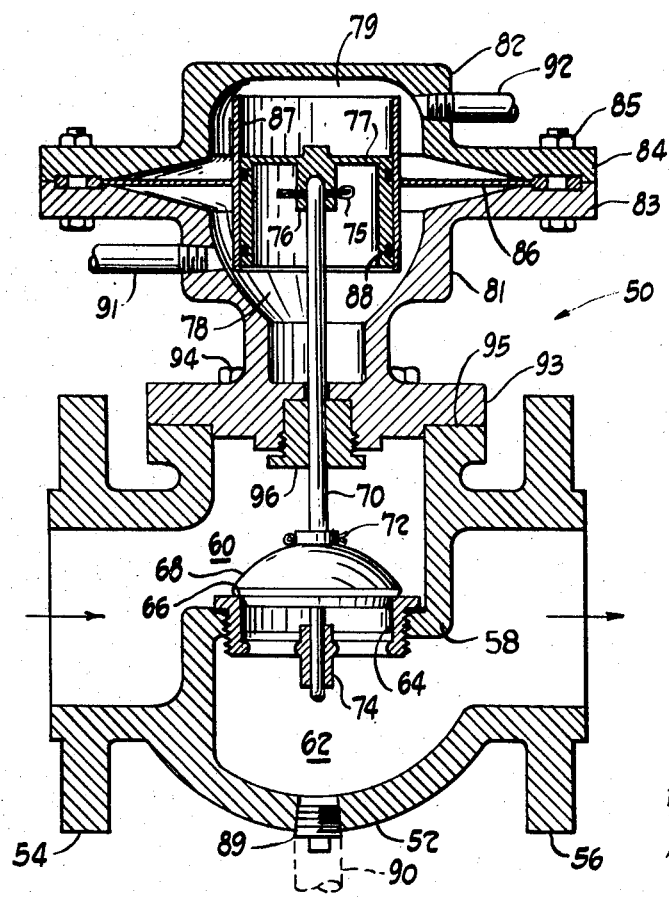
FIG. 2 is an enlarged sectional view of the flow control valve shown in the system of FIG. 1.

In the closed position of the valve, shown in FIG. 2, the valve body 68 is held against the valve seat by fluid pressure as well as by the weight of the valve sealing unit, the inlet chamber 60 being in direct communication with the relatively high pressure fluid supply and the discharge chamber 62 being in direct communication with the outlet pipe 20 which is connected to the relatively low pressure use. To raise the valve body 68 off its seat a differential pressure is applied to the piston 77. Since the tube 91 communicates the lower chamber 78 with the fluid pressure in the high side of the orifice plate assembly 40 while the conduit 92 communicates the chamber 79 with the fluid pressure in the low side of such assembly, it is apparent that when fluid is flowing into the system through the supply pipe 10 and out of the system through the use pipe 20, a higher unit pressure acts against the underside of the piston 77 than against the top thereof. Accordingly, when the system is active, the net fluid force on the piston tends to raise the valve body 68 from the seat 66.

From the foregoing it can be shown that the functioning of the valve 50 is in accordance with certain rules conveniently expressed as formulas. Assuming the system of FIG. 1 to be initially shut down with the valve 50 closed as in FIG. 2 and that the rate of flow of steam into the system through the supply pipe 10 and through the base load pipe 12 progressively increases, lifting of the valve body 68 from the valve seat 66 occurs when the following condition is satisfied:

$$A_s \times PD_o + W_s = PD_o \times A_p \qquad (I)$$

wherein: $A_s$ equals the area of the valve seat 66 in square inches;

$PD_o$ equals the pressure differential between the chambers 78 and 79 in pounds per square inch which is essentially the same as the pressure differential between the two sides of the closed valve body 68 across the valve seat 66, it being understood that the unit pressure in the chamber portion 78 exceeds that in the chamber portion 79;

$W_s$ equals the weight of the movable valve sealing unit including the valve body 68, the stem 70 and the piston 77, in pounds; and $A_p$ equals the area of the piston 77 in square inches.

At the instant the valve body 68 is raised from its seat 66 the pressure is equalized between the chambers 60, 62 and the valve body 68 instantly is withdrawn fully from the seat 66 by the differential fluid pressure acting on the piston 77.

In an operating condition wherein the rate of flow through the system progressively diminishes with the valve body 68 withdrawn from the seat 66 and fluid flowing through both the base load pipe line 12 and the main pipe line 14, the closing condition of the valve 50 occurs when the following condition is satisfied:

$$W_s = PD_c \times A_p \qquad (II)$$

wherein: $PD_c$ represents the pressure differential between the chambers 78 and 79 in pounds per square inch, the other symbols being the same as set forth above.

The difference between the lift-off Equation I and the closing condition Equation II is that the former includes the effect of the fluid pressure in the inlet chamber 60 holding the valve body 68 against its seat.

From the foregoing it is apparent that the operating characteristics of the valve can be varied to suit the requirements of any particular installation. It is necessary that the area of the piston 77 be at least slightly larger than the area of the valve seat 66 in order that the differential pressure on the piston can be effective to raise the valve body 68 off its seat.

In one installation in a system wherein steam was supplied at a pressure of from about 140 to about 180 pounds per square inch gauge, the system having base and main pipe lines of about 2 inches and about 4 inches nominal internal diameters, respectively, and a valve 50 with a valve seat 66 having an effective diameter of 4.06 inches (area of 12.97 square inches), a piston 77 of 4.375 inches in diameter (14.2 inches of area) provided sufficient force to raise the valve 68 off its seat at a differential pressure $PD_o$ equivalent to 180 inches of water. The same valve closed at a differential pressure $PD_c$ equivalent to 13 inches of water, the weight of the valve sealing unit comprising the valve 68, the rod 70 and the piston 77 being 8 pounds 11 ounces.

Figure 3:
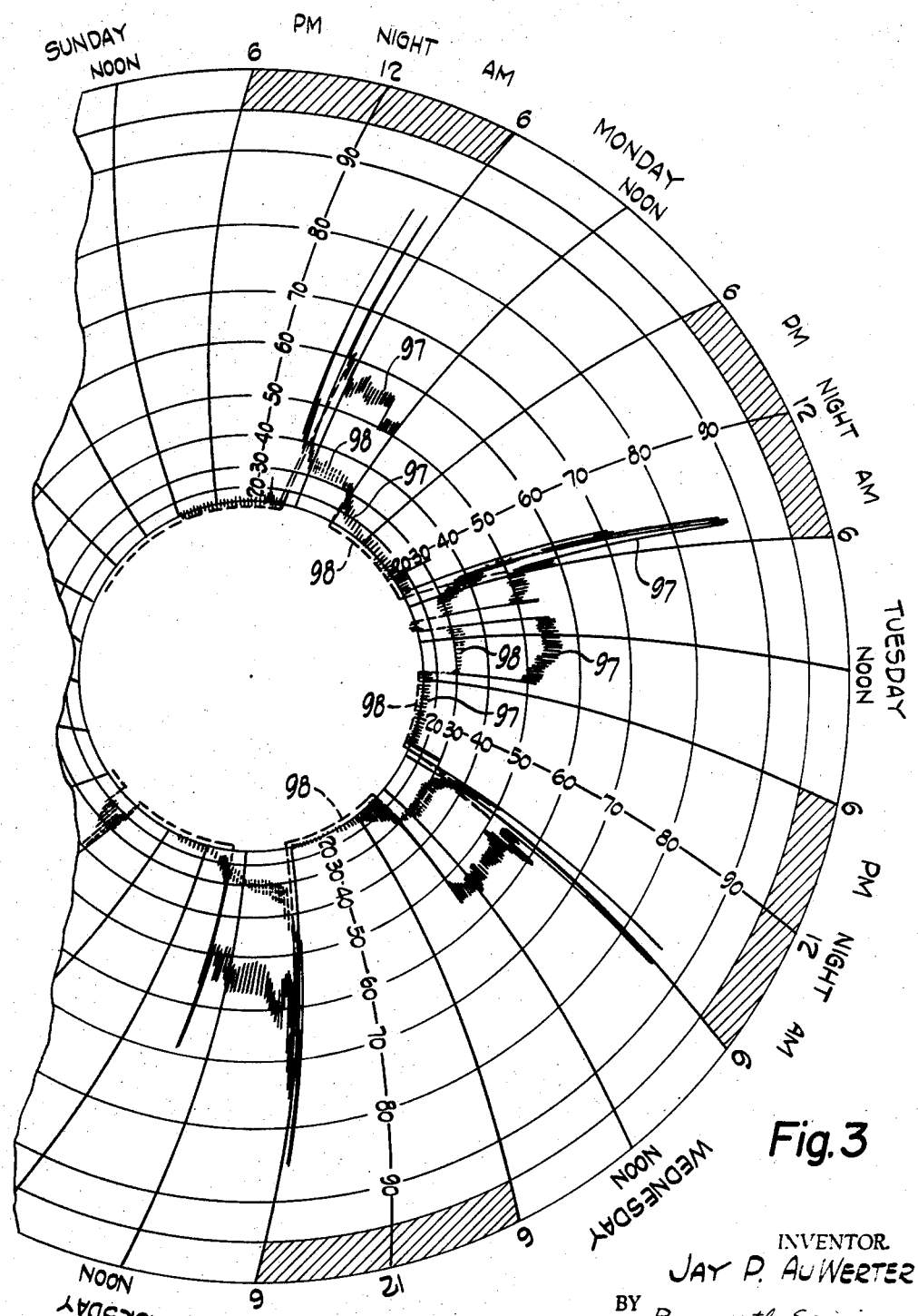
FIG. 3 is a reproduction of a flow meter integrator chart showing on a comparative basis the steam flow as recorded by the meters of the system of FIG. 1.

FIG. 3 is a reproduction of corresponding portions of the charts 30 and 30', superimposed one on the other, of the meters used in the foregoing example. The graph representing the flow of steam measured by the small meter 26 is indicated at 97 and by the large meter 26' is indicated at 98. The concentric circles of the graphs are the ordinates and are spaced to show percent of capacity of the particular meter represented. The curved radial lines divide the chart into time increments. Thus the graphs are derived from the operation of the two meter system over a period of several days, the intersection of the graphs with one of the radial lines (or a line drawn by interpolation between two of the curved radial lines) showing the condition of operation of the system in terms of the percent of capacity of the corresponding meters. Since the rate of flow corresponding to the rated capacity of each meter is known, the rate of flow corresponding to the percentage figures shown on the graphic charts can be readily determined or, if desired, indicated directly on the charts.

As shown in FIG. 3, the low rate meter 26 effectively carries the total load on the system during the night hours when the use is at a minimum as, for example, in heating a building to only a moderate temperature such as 60° F. to 65° F. Upon increase in load in the morning, such as a large heat demand to bring the building up to a temperature of about 70° F. to 75° F. for the work day, the valve 50 opens and both meters 26 and 26' are on stream and both remain on until late afternoon when the valve 50 closes and the entire load is carried by the smaller meter 26.

In another installation having proportionately larger pipe lines and a 22 pound valve sealing unit comprising body, rod and piston, with a valve seat 66 having an area of 109 square inches and a piston 77 of 113 square inches, the valve opened at a differential pressure $PD_o$ across the piston equivalent to 144 inches of water, closed at a differential pressure $PD_c$ across the piston equivalent to 4 inches of water.

The characteristics of the system are determined by the relationships between the gravitational force on the valve sealing unit and the vertical forces derived from the prevailing unit differential pressures acting on the effective areas of the valve body 68 resting on the valve seat 66 and the pressure responsive actuator or piston 77 which respectively augment and oppose the gravity force. By increasing the effective area of the piston 77, the differential unit pressure $PD_o$ necessary to open the valve 50 is relatively diminished as is the differential unit pressure $PD_c$ at which the valve closes; by increasing the effective area of the valve body 68 on its seat 66, the differential unit pressure necessary to open the valve is increased but the differential pressure $PD_c$ at which the valve closes is not affected. Therefore, in designing a system with reference to a particular pair of high and low range meters, a valve 50 is selected which provides a valve seat 66 of such diameter that, with a valve sealing unit of weight $W_s$ within reasonable limits, the differential unit pressure $PD_c$ expected to prevail at closing in accordance with Equation II is that which is desired to keep the meters from operating below their preferred ranges. The differential unit pressure desired for closing is obtained conveniently by adjusting the weight $W_s$ of the valve sealing unit in accordance with Equation II. Frictional drag or resistance of the piston 77 in the cylinder 87 or of a substituted diaphragm must be taken into account with the result that, in the examples given, the valve sealing units desirably may be made to weigh as much as several pounds more than theoretical consideration of the equations would indicate. Thus, in the first example given above, the valve sealing unit weighed about a pound more than called for by Equation II and in the second example the valve sealing unit exceeded the theoretical equation weight by five pounds.

After the valve has been selected with reference to the diameter of the seat 66 and the weight $W_s$ of the valve sealing unit, the size of the pressure responsive means or piston 77-cylinder 87 combination is determined by Equation I. The piston or other pressure responsive means is so chosen that the opening differential unit pressure $PD_o$ is that which occurs across the orifice in the assembly 40 when the flow through the base line pipe 12 loads the meter 26 to capacity, or substantially so. In thus referring to the capacity of the meters 26 and 26' it must be understood that they do not have fixed limits and their rated ranges or capacities are merely manufacturer's recommendations; it is not uncommon for such meters to be operated in ranges above rated capacities, especially when the high load occurs only occasionally and lasts for only a short period of time as when the valve 50 is about to open. Accordingly, the selection of the piston 77 may be such that the valve 50 opens at some load above the rated capacity of the meter 26; for example, at about 125% of the meter rating.

The choice of the meters 26 and 26' as to operating rates is in part governed by the requirement that the opening differential pressure $PD_o$ be well above the closing differential pressure $PD_c$ in order to avoid hunting. Thus it is desirable that the capacity rating of the high range meter 26' be effectively more than, that is several times the capacity rating of the low range meter 26 in order that when the valve 50 is about to be closed (because the differential unit pressure has dropped to $PD_c$ or below and is then insufficient to hold the valve body 68 off its seat) the total flow through the system is only a small fraction such as from about 10% to about 40%, preferably of the order of about 20% of the total rated capacity of the two meters. Moreover, the load prevailing when conditions are such that the valve 50 is about to be opened (because the differential pressure has increased to $PD_o$ or above and is then sufficient to raise the valve body 68 off its seat) is also only a small fraction, i.e. less than half, the total capacity of the system but in any event is greater than the load which exists under the valve closing condition. Thus, in the example mentioned, wherein the load prevailing at the valve closing condition is 20% of the total rated capacity, it is satisfactory for the valve 50 to open when the load is about 25% of the total rated capacity of the system. Of course, just prior to opening of the valve 50, the load is, as in the example given, 125% of the small meter rating. Since flow meters can safely be operated at loads above their ratings for short periods, the load at opening of the valve 50 may be as much as 150% of the full load rating of the smaller meter 26.

Considering the matter further, the load will require the major part of the rated capacity of the small meter 26 immediately upon closing the valve 50. Thus, in the example given wherein the load is approximately 20% of the capacity of the system at the instant the valve 50 is closed by dropping of the differential unit pressure to $PD_c$, such load desirably constitutes approximately 80% of the rated capacity of the small meter 26.

Thus the present invention provides a combination of low range 26 and high range 26' meters in a loop pipe system controlled by a specialized valve 50 in one arm 14 of the loop, such valve being responsive to conditions in another arm 12 of the loop indicative of the rate of fluid flow in such other arm. Line pressure in the high range arm 14 holds the valve 50 shut during low-load periods so that the load of steam or other fluid is measured solely by the low range meter 26. At a predetermined pressure differential across the orifice plate of the low range meter assembly which corresponds to a flow rate within but near the upper limit of the operating range of the meter, the corresponding pressure differential $PD_o$ produced across the piston 77 lifts the sealing unit of the valve 50 and opens the latter. The upward force on the valve sealing unit provided by the differential pressure $PD_o$ acting on the piston 77 overcomes both the weight of the valve sealing unit $W_s$ and the downward force on the seated valve body 68 resulting from the differential pressure across the latter, the last mentioned differential pressure being substantially equal to $PD_o$. Thereupon the valve 50 snaps open. With the valve 50 open, both the low range 26 and the high range 26' meters are functioning and together measure the load. The flow divides between the base load pipe 12 and the main load pipe 14 in accordance with a predetermined ratio, desirably of about one to four, established by the particular orifice plates selected for the assemblies 40 and 40' in accordance with known principles. Immediately on opening of the valve 50, both meters function, each at about 25% of its rated capacity. Both of the meters remain on stream until the total flow rate diminishes to a predetermined value such that the differential pressure across the piston 77 (which is substantially the same as the pressure differential across the orifice plate of the assembly 40) falls to a predetermined value $PD_c$ at which the net upward force on the piston 77 is insufficient to sustain the weight $W_s$ of the valve sealing unit and the latter drops, seating the valve body 68 and arresting the flow through the main pipe line 14. This occurs when the load on the low range meter 26 has dropped to a small fraction such as, in the example first mentioned, about 20% of its rated capacity. Thereafter, and until the differential pressure across the piston 77 again overcomes the closing forces, the entire flow occurs through the base load pipe line 12 and is measured by the meter 26 alone. At the closing of the valve 50, the increased flow through the base load line 12 increases the load on the low range meter 26 to about 80% or more of its rated capacity. As the valve body 68 approaches its seat 66, the downstream pressure diminishes so that a differential pressure is developed across the valve body 68 and acts with a downward force augmenting the force of gravity in effecting positive closing. The differential pressure across the seated valve body 68 insures its remaining seated even though small fluctuations of flow rate and differential pressure may occur; hunting is thus eliminated.

Although the system is described with a meter connected to the base line 12, it is apparent that it is adapted to be used with other devices or instrumentalities which produce a pressure differential proportioned to rate of flow that can be translated into a pressure differential across a suitable actuating pressure responsive means such as the piston 77.

Since each of the meters 26 and 26' is on a pipe line separate from the pipe line of the other, there is no possibility of measuring the same steam twice as is possible with series systems in which two meters are on the same pipe line and are intended to function alternatively, one measuring the flow over a range of relatively high rates and the other over a range of relatively low rates. It is feasible with some parallel line metering systems for a steam customer, by merely closing a valve in the low rate pipe line, to cause all the flow to take place through the pipe line having the high rate meter. Since the high range meter does not respond to low flow rates, some of the low-load steam is free to the customer. With the present system this cannot be done because closing the base load line 12 as by a valve (not shown) results in closing of the regulator valve 50 in the main pipe line 14 and stoppage of all flow to the use.

What is claimed and desired to be secured by United States patent is:

1. In a fluid flow control system comprising main and base load pipes connected in parallel between a source of fluid supply and a discharge, the base pipe having a supply leg connected to said source of fluid supply and a discharge leg connected to said discharge, means to produce a pressure drop between said supply leg and said discharge leg proportional to the rate of fluid flow through said base pipe, a valve connected in the main pipe and dividing it into a supply leg connected to said source of fluid supply and a discharge leg connected to said discharge, said valve comprising a casing having a passage and a horizontally disposed valve seat in the passage, a valve body cooperable with the seat to close the passage and dividing the casing into one portion located above the valve seat and connected to receive high pressure fluid from the supply leg of the main pipe and another portion located below the valve seat and connected to and subjected to the pressure in the discharge leg of the main pipe, means guiding the valve body for vertical movement between an open position in which the valve body is spaced above the seat and the passage is open for flow of fluid and a closed position in which the valve body rests on the seat and the through passage is closed, the valve body in closed position being biased toward the seat by a seating force comprising the resultant of gravitational forces acting on the valve body as a unit and the pressure differential acting over the area of the valve seat, means defining a chamber and a movable element dividing the chamber into high and low pressure portions and the movable element having constant effective areas exposed on opposite sides to the pressures prevailing in said high and low pressure chamber portions and which generates a lifting force under the influence of a pressure differential between the chamber portions, means communicating the pressure of fluid in the supply leg of the base pipe and in the discharge leg side of the base pipe to the high and to the low pressure portions, respectively, of the chamber, means connecting the movable element to the valve body, the effective area of the movable element being sufficiently greater than that of the valve seat and the weight of the valve body as a unit being such that at a predetermined rate of fluid flow in the base pipe and with the pressure differential between the high and low pressure portions of the chamber substantially equivalent to the pressure differential between said one and said other of the casing portions the lifting force exerted by the movable element overcomes the said seating force that biases the valve body toward the seat and raises the valve body from the seat with resultant loss of differential pressure between the one and the other of the casing portions effective on the valve body and the latter is moved by the lifting force to open position and remains in said open position to permit fluid to flow in said main pipe from said source to said discharge until at another predetermined rate of fluid flow in the base pipe lower than said valve opening rate and at which the lifting force is relatively reduced, the gravitational forces acting on the valve body as a unit overcome the reduced lifting force and the valve body moves to closed position shutting off the flow of fluid in said main pipe.

2. A system as defined in claim 1 wherein the connecting means comprises a rod extending through one casing portion and the high pressure chamber portion and the guiding means has a sliding fit with the rod.

3. A system as defined in claim 2 wherein the casing and the chamber defining means are secured together and wholly enclose the rod.

4. A system as defined in claim 1 wherein the movable element comprises a cylinder and a piston slidable in the cylinder, the connecting means being attached to the piston.

5. A system as defined in claim 4 wherein the casing and the chamber defining means are secured together and the connecting means comprises a rod connected between the piston and the valve body.

6. A system as defined in claim 1 wherein the connecting means is wholly enclosed by the casing and the chamber defining means, and the connecting means has a sliding fit in the guiding means.

7. A system as defined in claim 1 wherein the low pressure chamber portion is generally above and the high pressure chamber portion is generally below the movable element and the movable element and the valve body are on the same vertical axis.

8. A system as defined in claim 1 wherein the main and base load pipes are connected together and to a common source of supply so that the fluid pressure in the high pressure casing portion is and remains substantially the same as the fluid pressure in the high pressure chamber portion.

9. A system as defined in claim 8 having a relatively low rate flow meter connected to the base pipe across the flow restricting means and arranged to measure the fluid flow through said base pipe, a relatively high rate flow meter connected to the main pipe and arranged to measure the fluid flow through the main pipe, the rated capacity of the high rate meter being of the order of about four times the rated capacity of the low rate meter, and, when the valve is open, the flow restricting means proportioning the fluid flow between the pipes to flow substantially 80% through the main pipe and substantially 20% through the base load pipe.

10. A system as defined in claim 1 wherein the valve is so designed and arranged that, with the system operating and the valve body seated, the valve body is lifted from the seat and the supply leg of the main pipe is placed in communication with the discharge leg of the main pipe through the valve passage when the conditions are such that:

$$A_s \times PD_o + W_s = PD_o \times A_p$$

wherein:
  $A_s$ is the area of the valve seat in square inches,
  $PD_o$ is the pressure differential between the high and low chambers in pounds per square inch,
  $W_s$ is the gravitational force on the valve body, and
  $A_p$ is the effective area of the movable element in square inches.

11. A system as defined in claim 1 wherein the valve is so designed and arranged that with the system operating and the valve body withdrawn from the seat the valve body is lowered onto the seat to seal the passage and the communication between the supply and discharge legs of the main pipe when the conditions are such that:

$$W_s = PD_c \times A_p$$

wherein:
  $W_s$ is the gravitational force on the valve body,
  $PD_c$ is the pressure differential between the high and low chambers in pounds per square inch, and
  $A_p$ is the effective area of the movable element in square inches.

References Cited

UNITED STATES PATENTS

| | | | |
|---|---|---|---|
| 862,867 | 8/1907 | Eggleston | 251—61.1 X |
| 2,569,554 | 10/1951 | Buttolph | 137—501 X |
| 2,949,125 | 8/1960 | Gilmore et al. | 137—110 X |

FOREIGN PATENTS

| | | |
|---|---|---|
| 746,386 | 7/1944 | Germany. |
| 1,099,190 | 2/1961 | Germany. |

WILLIAM F. O'DEA, Primary Examiner

DAVID J. ZOBKIW, Assistant Examiner

U.S. Cl. X.R.

73—197; 137—115, 117, 501, 503